United States Patent [19]
Flierl et al.

[11] Patent Number: 5,737,188
[45] Date of Patent: Apr. 7, 1998

[54] CONTROL MODULE FOR MOTOR VEHICLES

[75] Inventors: Werner Flierl, Sulzbach-Rosenberg; Michael Genzel, Rosstal; Armin Gottschaller, Neumarkt; Gerhard Hettich, Dietenhofen; Thomas Schmid, Nürnberg, all of Germany

[73] Assignee: TEMIC TELEFUNKEN microelectronic GmbH, Heilbronn, Germany

[21] Appl. No.: 635,644

[22] Filed: Apr. 22, 1996

[30] Foreign Application Priority Data

Apr. 28, 1995 [DE] Germany .................. 195 15 622.6

[51] Int. Cl.[6] .................................................. H05K 7/20
[52] U.S. Cl. .................................................. 361/715
[58] Field of Search .................................. 361/704, 707, 361/715, 716, 752, 723, 728, 730, 813

[56] References Cited

U.S. PATENT DOCUMENTS

| | | |
|---|---|---|
| 4,639,835 | 1/1987 | Daubresse . |
| 4,766,520 | 8/1988 | Huber et al. ............... 361/813 |
| 4,785,532 | 11/1988 | Galloway et al. . |
| 4,899,256 | 2/1990 | Sway-tin ............... 361/715 |
| 5,127,440 | 7/1992 | Maas et al. . |
| 5,212,627 | 5/1993 | No ............... 361/715 |
| 5,519,252 | 5/1996 | Soyano et al. ............... 361/728 |
| 5,521,785 | 5/1996 | Schmidt et al. ............... 361/715 |

FOREIGN PATENT DOCUMENTS

| | | |
|---|---|---|
| 0497198 | 8/1992 | European Pat. Off. ............... 361/730 |
| 3311743 | 10/1984 | Germany . |
| 3604074 | 8/1987 | Germany . |
| 3836405 | 5/1990 | Germany . |
| 3837974 | 5/1990 | Germany . |
| 4019787 | 1/1991 | Germany . |
| 4015311 | 11/1991 | Germany . |
| 4102349 | 7/1992 | Germany . |
| 9307228 U | 8/1993 | Germany . |
| 4410061 | 9/1994 | Germany . |
| 4327584 | 2/1995 | Germany . |
| 4415133 | 6/1995 | Germany . |

*Primary Examiner*—Gregory N. Thompson
*Attorney, Agent, or Firm*—Spencer & Frank

[57] ABSTRACT

A motor vehicle control module is described comprising a control unit with a carrier body, a circuit arrangement applied on the carrier body, a housing body that at least partially encloses the carrier body, at least one stamped grid with several stamped grid connections integrated in the housing body, and also the sensors and/or actuators with sensor elements and sensor connections and respectively actuator elements and actuator connections associated to the control unit. To reduce the space requirement and the costs and to improve the susceptibility to faults in the signal transmission from the sensors/actuators to the control unit, at least some of the sensors/actuators are situated in the control unit or in the immediate proximity of the control unit and are contacted by directly joining their respective sensor connections or actuator connections with stamped grid connections of the stamped grid of the control unit.

5 Claims, 5 Drawing Sheets

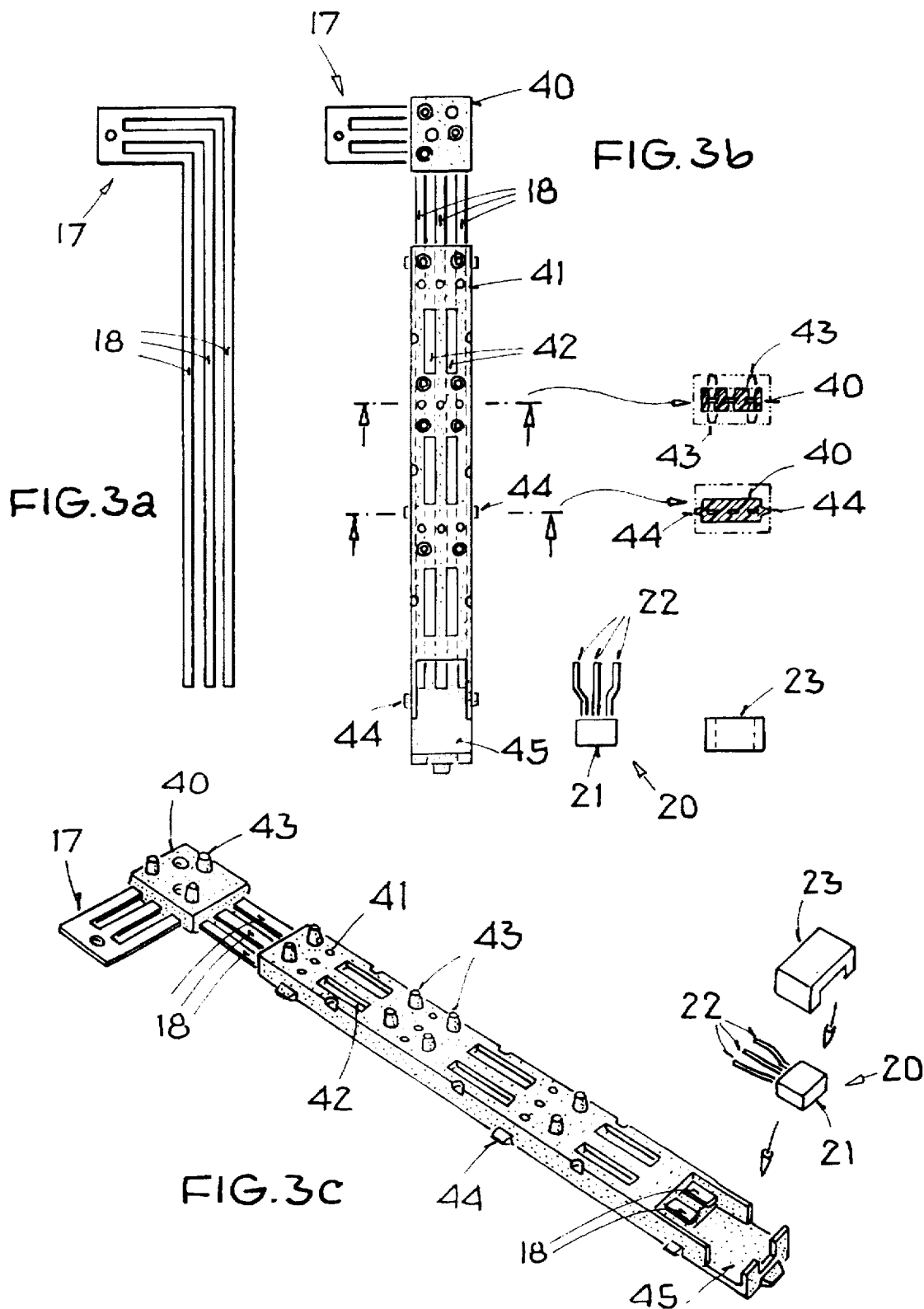

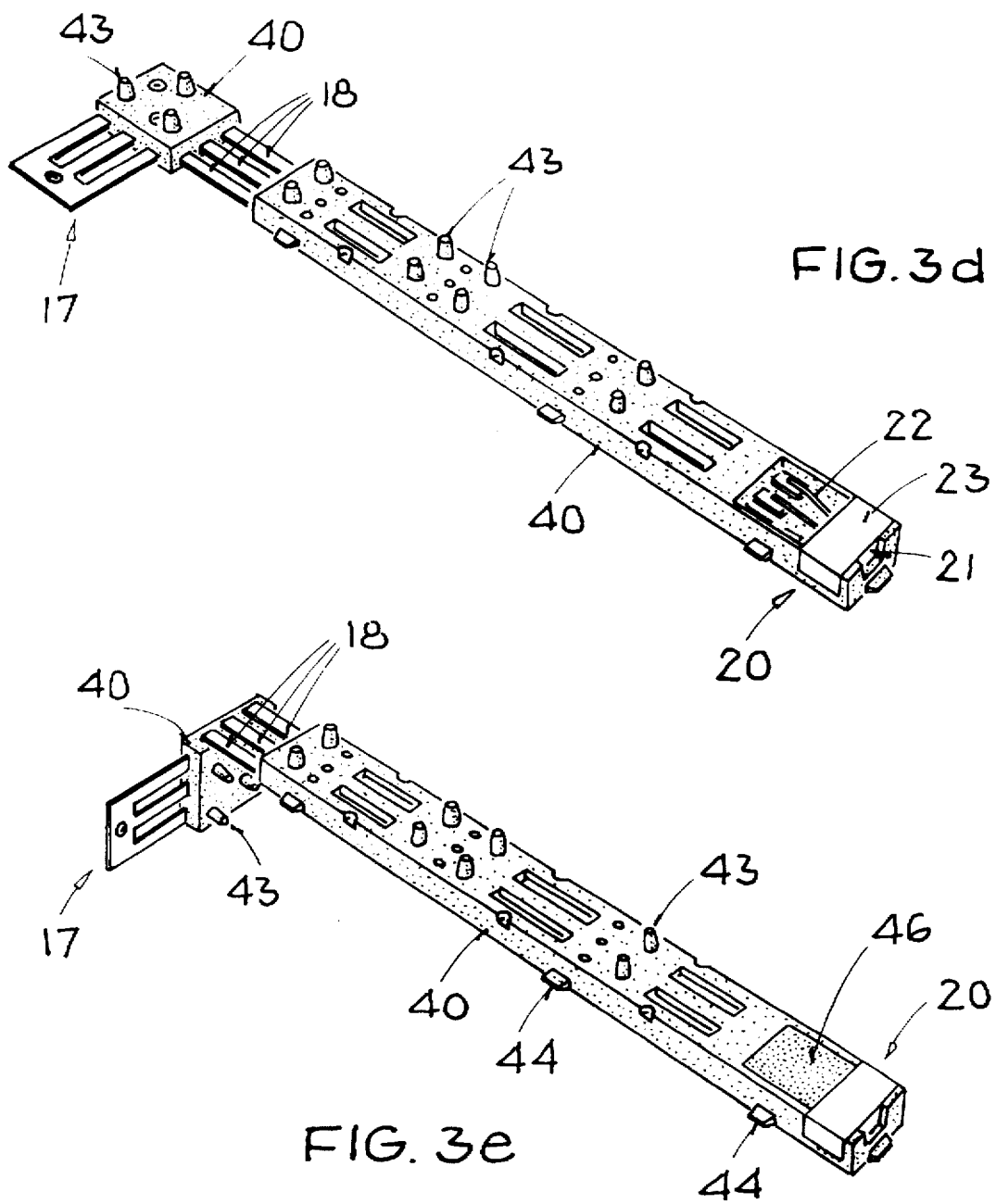

CONTROL MODULE FOR MOTOR VEHICLES

BACKGROUND OF THE INVENTION

In motor vehicles, control modules are being used increasingly as control units and associated sensors/actuators for a variety of tasks and means of operation—in particular for the open-loop and/or closed loop control of travel-specific operations and processes. The sensors serve to acquire measured values and the actuators to operate final controlling elements (for instance, sensors are provided for measuring temperature, engine speed or pressure and actuators for operating on-off valves or motors) while the measured-value signals from the sensors and the output signals from the actuators are processed and evaluated by the control units of the motor vehicle. The sensors consist of a sensor element and sensor connections and the actuators consist of an actuator element and actuator connections. The control units are made up of a carrier element (printed circuit board) with circuitry arranged on it and a housing which encloses at least part of the circuit arrangement, where a stamped grid is integrated in the housing and is connected electrically to the circuit arrangement (for instance, by means of bond wires) to provide the terminal contacts and connector. The sensors and actuators that are normally fitted to the motor vehicle units (engine, gearbox etc.) through separate connecting parts (such as threads) and hermetically enclosed by a housing are connected to the separately arranged control units (for instance, in the engine compartment or in the interior of the motor vehicle) by means of connecting leads and connectors on the stamped grid of the control units.

With these motor vehicle control modules comprising sensors/actuators and associated control units, it is a disadvantage that in order to connect the sensors/actuators to the control units numerous frequently very long connecting leads (cable tree) and numerous connectors are required for contacting. It is often difficult to locate these in the motor vehicle and they take up a lot of space and are very costly. Another disadvantage is that the reliability of signal transmission is not always guaranteed because of the long signal path from the sensors/actuators to the control units and because of the susceptibility to faults in the connecting leads and connectors.

SUMMARY OF THE INVENTION

The object of the invention is to provide a control module for motor vehicles of the type discussed above that avoids the disadvantages outlined above and has other advantageous features.

This object is solved in accordance with the invention by a motor vehicle control module which comprises: a control unit with a carrier body, a circuit arrangement applied to the carrier body, a housing body at least partially enclosing the carrier body, and at least one stamped grid with several stamped grid connections integrated in the housing body; and, sensors and/or actuators formed respectively, of sensor elements and sensor connections and of actuator elements and actuator connections, assigned to the control unit; and wherein at least some of the sensors and/or actuators are arranged in the control unit or in the immediate proximity of the control unit, and these sensors and actuators are contacted by directly joining their sensor connections and actuator connector connections to stamped grid connections of the stamped grid of the control unit.

Advantageous further developments of the invention are disclosed and claimed.

In the control module described here, at least some (preferably all) of the sensors/actuators are contacted directly with the associated control unit by joining the connections of the sensors/actuators directly to the stamped grid connections of the control unit. With sensors/actuators situated in the immediate proximity of the control unit, this direct joining and contacting of the sensor/actuator connections is effected, for example, by means of spring elements or forked elements, fitted to the ends of the stamped grid connections, that encompass or enclose the sensor/actuator connections. This direct joining and contacting is effected preferably, however, by attaching the sensor/actuator elements to the stamped grid or stamped grids of the control unit and by making an electrical contact between the sensor/actuator connections and the stamped grid connections. In this preferred embodiment, the sensors/actuators, i.e., the sensor/actuator elements and the sensor/actuator connections, are, together with the stamped grids and the stamped grid connections respectively, enclosed by the housing body of the control unit. The number of sensors/actuators provided and the number of sensor/actuator connections to be contacted determines the number of stamped grids required in the control unit and the number of stamped grid connections on the respective stamped grid.

Owing to the direct joining and contacting of sensors/actuators and control unit, the control module described has the following advantageous features:

- the complexity of connecting leads (cables) in the motor vehicle is reduced drastically, resulting not only in simplifications in manufacture but also in a reduction of the space required and the costs;
- contacting of the sensors/actuators is effected without connectors, leading to a further reduction of the space required and the costs;
- the susceptibility to faults in signal transmission is reduced and hence the reliability and electromagnetic compatibility of the control module is improved;
- in the event of the sensors/actuators being attached directly to the stamped grid connections of the control unit, no separate housing is required for the sensors/actuators.

BRIEF DESCRIPTION OF THE DRAWINGS

A control module for the gearbox control of a motor vehicle will now be described in more detail with reference to the drawing. In various sectional views of the control module.

DESCRIPTION OF A PREFERRED EMBODIMENT

Figure 1:
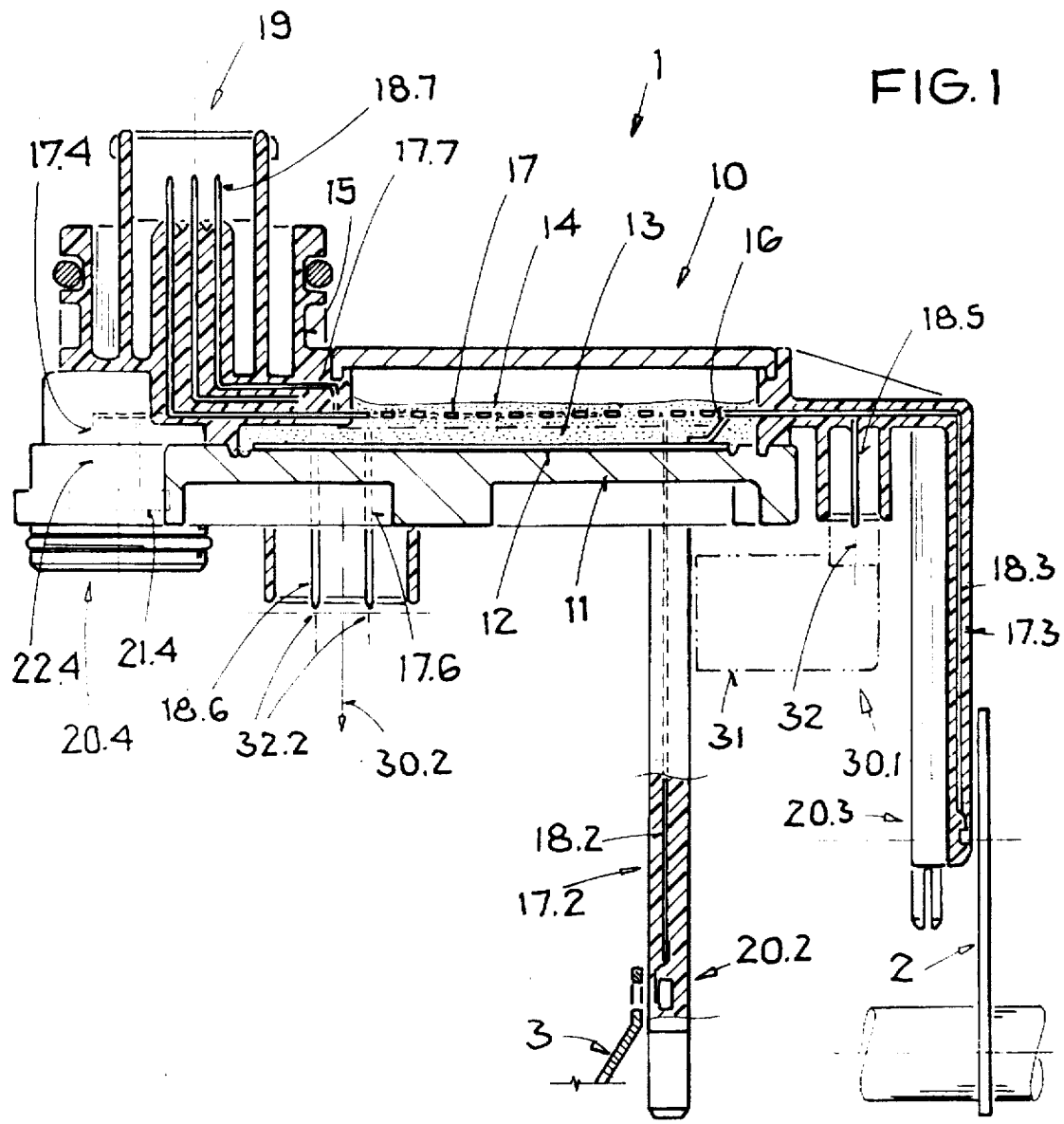
FIGS. 1 and 2 show possibilities of joining sensors/actuators to a control unit.
Figure 2:
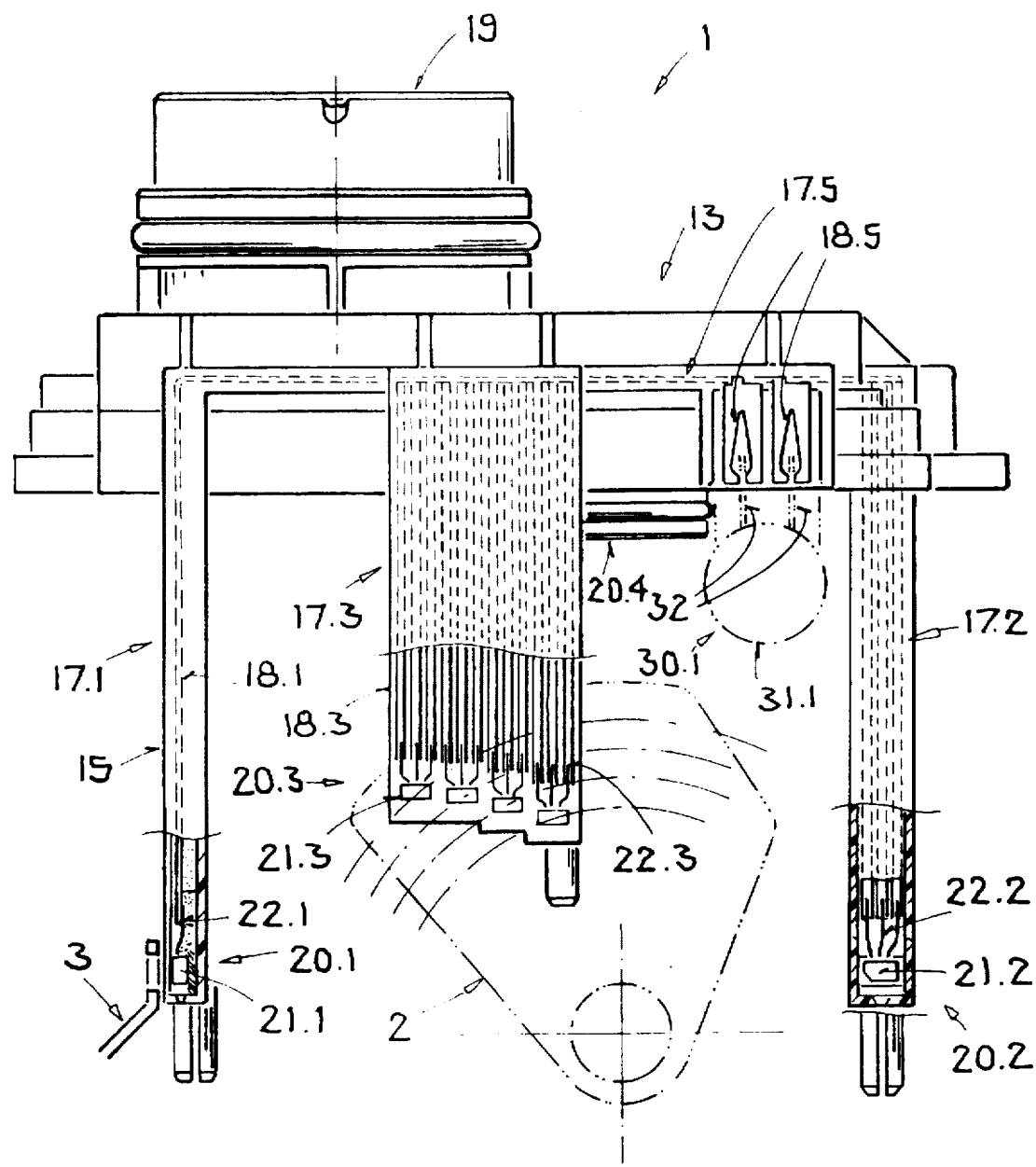

In accordance with FIGS. 1 and 2, the (gearbox) control module 1 integrated in the gearbox equipment space comprises a gearbox control device as control unit 10, several sensors 20 for measurement of rotational speed, for registering pressure and for identifying selector lever position, and actuators 30 for valve operation.

The gearbox control unit 10 of control module 1 consists of a baseplate 11 designed, for example, as a heat sink (and made, for example, of aluminum with the dimensions 160 mm×150 mm×14 mm), a carrier body 12 designed, for example, as a printed circuit board joined to the baseplate 11 thermally and mechanically by adhesion (and made, for example, of $Al_2O_3$ with the dimensions 110 mm×80 mm×1 mm), a thick film circuit arrangement 13 on the carrier body 12 with numerous passive and active SMD semiconductor components potted with a molding compound 14, a housing body 15 (made, for example, of glassfiber-reinforced plastic) which encloses the circuit arrangement 13 to protect the semiconductor elements, several (for example nine) stamped grids 17 integrated horizontally and vertically in the housing body 15 and joined to the circuit arrangement 13 by means of (for example) bond wires 16, whereby these stamped grids can have a varying number of stamped grid connections 18 (for example, between 3 and 12 stamped grid connections), and a connector 19 through which the gearbox control unit 10 and the control module 1 are connected to the gearbox by means of connecting leads in such a way that the gearbox receives the output signal from the control module 1 or gearbox control unit 10 in the form of a control signal. Many of the stamped grids 17 make up the connector 19 of the gearbox control unit 10, and the rest of the stamped grids 17 take up and contact the sensors 20 and actuators 30. For the sake of clarity, only some of the stamped grids 17 are shown in FIGS. 1 and 2: stamped grids 17.1–17.4 for contacting sensors 20, stamped grids 17.5 and 17.6 for contacting actuators 30, and stamped grid 17.7 for forming a part of connector 19.

Three rotary speed sensors 20.1, 20.2 designed as Hall sensors for registering rotational speed, four selector lever sensors 20.3 for identifying selector lever position and designed as Hall sensors, and one pressure sensor 20.4 for registering pressure are provided as sensors 20 of the gearbox control module 1. The four selector lever sensors 20.3 are arranged on the stamped grid 17.3, two speed sensors 20.1 on the stamped grid 17.1, one speed sensor 20.2 on the stamped grid 17.2 and the pressure sensor 20.4 on the stamped grid 17.4. Also, an actuator 30.1 (made, for example, in the form of a proportional valve) joined to the stamped grid 17.5 is provided and an actuator 30.2 (made, for example, in the form of a proportional valve) joined to the stamped grid 17.6. The selector lever sensors 20.3 activated by the selector lever shaft 2 detect the position of the gearbox selector lever according to the driver's command (parked/forwards/reverse), the two speed sensors 20.1 detect the engine output speed and the power output direction of encoder 3, the speed sensor 20.2 detects the rotational speed of the engine, the pressure sensor 20.4 registers the gearbox oil pressure, the actuator 30.1 controls the gearbox ratio and the actuator 30.2 controls the gearbox oil cooling. The information from sensors 20 and actuators 30 is sent on to the gearbox control unit 10 which processes this information and supplies a control signal. Each of the sensors 20 consists of a sensor element 21 as sensor body and three sensor connections 22, the actuators 30 of an actuator element 31 as actuator body and two actuator connections 32.

The sensors 20 and the gearbox control device 10 are joined by placing (for example, by surface welding) the sensor elements 21 on the respective stamped grids 17 (two sensor elements 21.1 on stamped grid 17.1, one sensor element 21.1 on stamped grid 17.2, four sensor elements 21.3 on stamped grid 17.3, one sensor element 21.4 on stamped grid 17.4) and by contacting the respective three sensor connections 22 (22.1, 22.2, 22.3, 22.4) with the corresponding stamped grid connections 18 (18.1, 18.2, 18.3, 18.4). The conductive link between the actuators 30 (30.1, 30.2) and the gearbox control device 10 is effected by directly contacting the stamped grid connections 18 (18.5, 18.6) (which have forked/spring elements at their ends) of the corresponding stamped grid 17 (17.5, 17.6) with the two actuator connections 32 (32.1, 32.2) of the actuators 30 (30.1, 30.2) that are immediately adjacent to the gearbox control device 10—for instance, by enclosing or toothing the actuator connections by means of the forked/spring elements.

The process for manufacturing the gearbox control module 1 from gearbox control device 10 and sensors 20/actuators 30 will now be described with reference to FIG. 3. Various steps in the process are shown in FIGS. 3a to 3g:

FIG. 3a shows a single stamped grid 17 of the gearbox control device 10 with three stamped grid connections 18 made, for example, of a copper-tin alloy (such as copper alloyed with 6% tin).

FIG. 3b shows the top view and FIG. 3c shows the side view of the stamped grid 17 partially coated with plastic 40 (a "primary coated part"). In the plastic 40 on both sides (on the upper side and on the lower side) at the level of the stamped grid connections 18, holes 41 are formed for centering; between the stamped grid connections 18, openings 42 are formed as separating aids; and on the upper side of the plastic 40, elevations 43 ("noses") and also on the side of plastic 40 elevations 44 are formed as a centering aid and to support the primary coated part. Furthermore, at one end of the stamped grid 17 and on the upper side of the plastic 40 there is a recess 45 for mounting a magnet 23 used for signal amplification and the sensor 20 (sensor element 21, sensor connections 22) bonded on it.

FIG. 3d shows the stamped grid 17 partially coated with plastic 40 and with sensor 20 and magnet 23 integrated in the recess 45.

In FIG. 3e, the recess 45 is filled with a silicon molding compound to protect the sensor connections 22; the end piece of the stamped grid 17 opposite to the sensor 20 has been bent downwards by 90°.

Figure 3F:
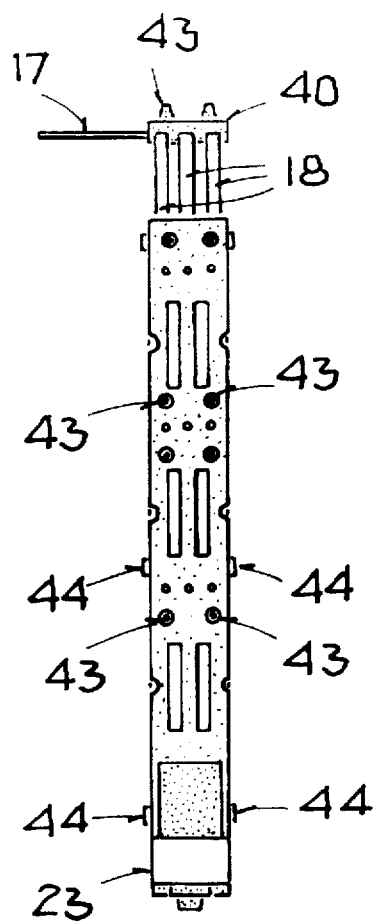
FIG. 3 (FIGS. 3a to 3g) shows several steps in the process of manufacturing the control module. In the drawing figures, groups of common elements are indicated with a common reference numeral, with the individual elements of the group being indicated with the group designating reference numeral followed by a decimal point and a further numeral. For example, the illustrated sensors are all identified by the reference numeral 20, with individual sensors being identified by 20.1, 20.2, 20.3, etc.

In FIG. 3f, the stamped grid 17 prepared for placing in an injection mold is shown in top view; the grid is coated in the injection mold with a second plastic material (such as glass-fiber reinforced plastic, for example) to form the housing body 15.

Figure 3G:
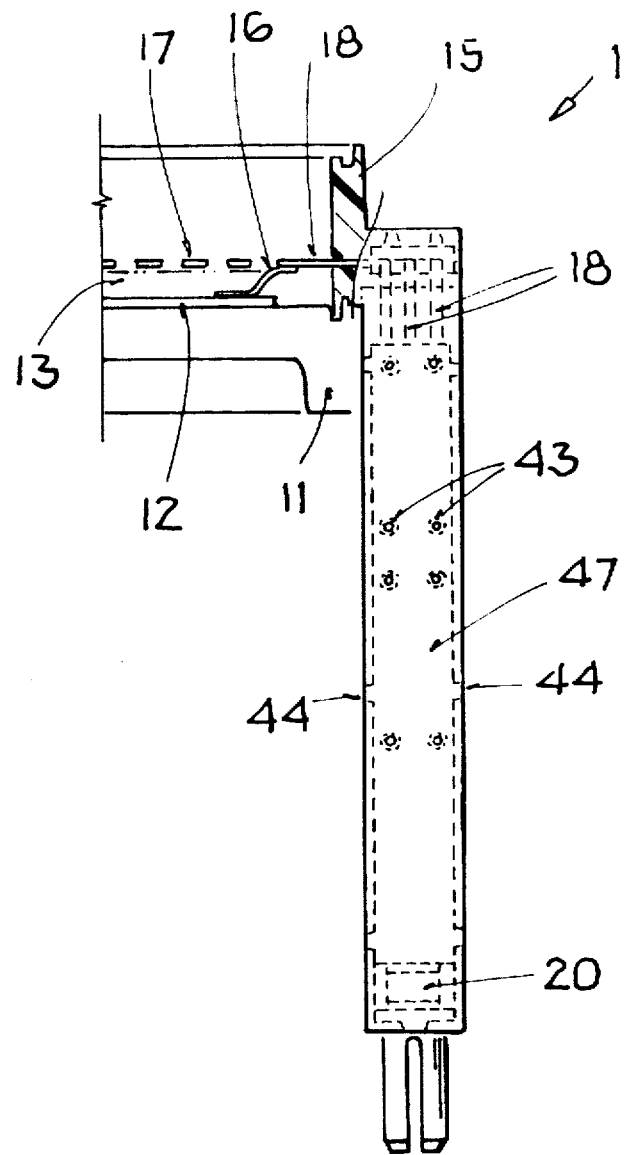

FIG. 3g shows a partial view of the finally assembled control module 1; the circuit arrangement 13 situated on the heat sink 11 and the printed circuit board 12 has been joined here to the stamped grid 17 and the stamped grid connections 18 by means of bond wires 16. The circuit arrangement 13 and the stamped grid 17 (and therefore also the sensor 20) are enclosed by housing body 15.

What is claimed is:

1. Motor vehicle control module comprising:
    a control unit with a carrier body, a circuit arrangement disposed on the carrier body, a housing body at least partially enclosing the carrier body, and at least one stamped grid with several stamped grid connections integrated in the housing body; and,
    sensors and actuators formed respectively, of sensor elements and sensor connections and of actuator elements and actuator connections, for the control unit; and,
    wherein:
    at least some of the sensors and actuators are arranged in the control unit or in the immediate proximity of the control unit, and, these at least some of the sensors and actuators are contacted by directly joining their sensor connections and actuator connector connections to stamped grid connections of the stamped grid of the control unit.

2. Control module in accordance with claim 1, wherein the at least some of the sensor elements and actuator elements of the sensors and actuators are each mounted on one of the at least one stamped grid, the sensor connections and actuator connections are joined conductively with the stamped grid connections of the associated at least one stamped grid and the sensors and actuators are enclosed by the housing body of the control unit.

3. Control module in accordance with claim 1, wherein at least one stamped grid of the control unit has forked/spring elements, and wherein the sensor connections and actuator connections of the sensors and actuators situated in the immediate vicinity of the control unit are joined conductively by pressure with the spring/forked elements of the stamped grid connections of the stamped grids.

4. Control module in accordance with claim 1, wherein the carrier body is arranged on a baseplate designed as a heat sink.

5. Control module in accordance with claim 1, wherein the housing body of the control unit (10) is made of a plastic material.

* * * * *